(12) United States Patent
Kesler et al.

(10) Patent No.: US 11,885,030 B2
(45) Date of Patent: Jan. 30, 2024

(54) HYDROXY GAS GENERATOR

(71) Applicant: KKHHO Holdings, LLC, Scottsdale, AZ (US)

(72) Inventors: Kris Kesler, Paradise Valley, AZ (US); Douglas Lee Harkey, Flagstaff, AZ (US)

(73) Assignee: MATTUR HOLDINGS, INC., Scottsdale, AZ (US)

( * ) Notice: Subject to any disclaimer, the term of this patent is extended or adjusted under 35 U.S.C. 154(b) by 323 days.

(21) Appl. No.: 17/470,507

(22) Filed: Sep. 9, 2021

(65) Prior Publication Data

US 2022/0081783 A1 Mar. 17, 2022

Related U.S. Application Data (60) Provisional application No. 63/078,649, filed on Sep. 15, 2020.

(51) Int. Cl.
*C25B 1/04* (2021.01)
*F02M 25/12* (2006.01)
*C25B 9/70* (2021.01)

(52) U.S. Cl.
CPC ............... *C25B 1/04* (2013.01); *C25B 9/70* (2021.01); *F02M 25/12* (2013.01)

(58) Field of Classification Search
CPC .............. C25B 1/04; C25B 9/70; F02M 25/12
See application file for complete search history.

(56) References Cited

U.S. PATENT DOCUMENTS

| | | | | |
|---|---|---|---|---|
| 10,920,717 | B1 * | 2/2021 | Owens | C25B 15/081 |
| 11,708,799 | B1 * | 7/2023 | Phan | F02D 41/32 |
| | | | | 123/3 |
| 11,746,730 | B1 * | 9/2023 | Williams | F02M 25/12 |
| | | | | 123/525 |
| 2017/0211192 | A1 * | 7/2017 | Bozhilov | F02M 25/12 |

* cited by examiner

*Primary Examiner* — Sikarl A Witherspoon
(74) *Attorney, Agent, or Firm* — K&L Gates LLP (57) ABSTRACT

Methods and systems for improved generation of hydroxy gas are presented. In one embodiment, a hydroxy gas generator is provided that includes a gas generation chamber that contains water and anode-cathode pairs. The anode-cathode pairs may be configured to generate hydroxy gas using a continuously-flowing supply of water. The hydroxy gas generator may also include a water structuring device that reduces the surface tension of the continuously-flowing supply of water. The water structuring device may also magnetically orient the molecules of the continuously-flowing supply of water. The hydroxy gas generator may further include a gas isolation system for extracting hydroxy gas from the gas generation chamber.

23 Claims, 6 Drawing Sheets

HYDROXY GAS GENERATOR

This application claims the benefit of and priority to U.S. Provisional Patent Application No. 63/078,649 filed on Sep. 15, 2020, the entire contents of this application are incorporated herein by reference in its entirety for all purposes.

BACKGROUND

Hydroxy gas (i.e., HHO gas, oxyhydrogen gas) may be used in various industrial settings. For example, hydroxy gas may be ignited and may serve as fuel in various applications. For example, hydroxy gas may be used as fuel for a generator. For use in such industrial applications, a supply of hydroxy gas is required. Hydroxy gas may be produced by applying an electrical current to water.

SUMMARY

The present disclosure presents new and innovative systems and methods for generating hydroxy gas. In one aspect, a hydroxy gas generator is provided that includes a gas generation chamber containing water and a plurality of anode-cathode pairs within the gas generation chamber configured to generate hydroxy gas using a continuously-flowing supply of water. The hydroxy gas generator may also include a water structuring device configured to (i) reduce the surface tension of the continuously-flowing supply of water and (ii) magnetically orient molecules of the continuously-flowing supply of water and a gas isolation system for extracting hydroxy gas from the gas generation chamber.

In a second aspect according to the first aspect, the water structuring device reduces the surface tension of the continuously-flowing supply of water by causing the water to flow through a plurality of spheres.

In a third aspect according to the second aspect, the plurality of spheres reduce the surface tension of the continuously-flowing supply of water by creating vortexes within the continuously-flowing supply of water.

In a fourth aspect according to any of the second and third aspects, at least a subset of the plurality of spheres have a diameter of at least 0.4 inches.

In a fifth aspect according to any of the second through fourth aspects, the plurality of spheres create magnetic fields that magnetically orient the molecules of the water.

In a sixth aspect according to the fifth aspect, the plurality of spheres are charged with a magnetic field of at least 1 Tesla.

In a seventh aspect according to any of the second through sixth aspects, at least a subset of the plurality of spheres are gold plated.

In an eighth aspect according to any of the first through seventh aspects, the surface tension of the continuously-flowing supply of water is reduced by at least 20%.

In a ninth aspect according to any of the first through eighth aspects, the gas generation chamber includes at least 7 anode-cathode pairs.

In a tenth aspect according to any of the first through ninth aspects, the plurality of anode-cathode pairs are harmonically tuned to have an electrical resonant frequency at a predetermined frequency.

In an eleventh aspect according to the tenth aspect, the predetermined frequency is between 200-400 Hz.

In a twelfth aspect according to any of the first through eleventh aspects, the plurality of anode-cathode pairs operate at a predetermined voltage of 30-60 V.

In a thirteenth aspect according to any of the first through twelfth aspects, the plurality of anode-cathode pairs have jetted caps.

In a fourteenth aspect according to any of the first through thirteenth aspects, the anodes of the plurality of anode-cathode pairs include aeration holes where the continuously-flowing supply of water is received.

In a fifteenth aspect according to any of the first through fourteenth aspects, the hydroxy gas is generated as microbubbles within the water.

In a sixteenth aspect according to any of the first through fifteenth aspects, the hydroxy gas generator further includes a water chiller for reducing the temperature of the continuously-flowing supply of water.

In a seventeenth aspect according to the sixteenth aspect, the water chiller reduces the temperature of the continuously-flowing supply of water to 65° F. or less.

In an eighteenth aspect according to any of the sixteenth and seventeenth aspects, the continuously-flowing supply of water proceeds through the water chiller prior to entering the anode-cathode pairs.

In a nineteenth aspect according to any of the first through eighteenth aspects, the hydroxy gas generator further includes a water recombination system for combining the hydroxy gas with a secondary supply of water to generate an oxygenated and hydrogenated water.

In a twentieth aspect according to the nineteenth aspect, the oxygenated and hydrogenated water is applied to an agricultural site.

In a twenty-first aspect, a method is provided that includes structuring a continuously-flowing supply of water using a water structuring device to (i) reduce the surface tension of the continuously-flowing supply of water and (ii) magnetically orient molecules of the continuously-flowing supply of water. The method may further include passing the continuously-flowing supply of water through a plurality of anode-cathode pairs to generate hydroxy gas and extracting the hydroxy gas using a gas isolation system.

In a twenty-second aspect, a water structuring device is provided for use in a hydroxy gas generator. The water structuring device may include an inlet for receiving a continuously-flowing supply of water and an outlet for providing the continuously-flowing supply of water to a plurality of anode-cathode pairs. The water structuring device may also include a plurality of magnetically-charged spheres arranged into a plurality of centrally-aligned rings along a direction of flow of the continuously-flowing supply of water from the inlet to the outlet, wherein the plurality of centrally-aligned rings includes at least 7 centrally-aligned rings and wherein each of at least a subset of the centrally-aligned rings includes at least 7 magnetically-charged spheres.

In a twenty-third aspect, an anode-cathode pair is provided for use in a hydroxy gas generator. The anode-cathode pair includes an inlet end for receiving water, an outlet end for providing water containing hydroxy gas, and a cathode extending from the inlet end to the outlet end. The anode-cathode pair may also include an anode positioned radially exterior to the cathode and extending from the inlet end to the outlet end, wherein the anode includes a plurality of aeration holes near the inlet end and a jetted cap located at the outlet end. The anode and the cathode are harmonically tuned to have an electrical resonant frequency at a predetermined frequency.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Existing hydroxy gas generators may be used to generate hydroxy gas from water. In particular, existing hydroxy gas generators may apply an electrical current to a fixed, non-circulating volume of water and may extract the hydroxy gas from the water as it is generated by the electrical current. In such implementation, the electrical current may be applied to the fixed volume of water such that the water itself turns to steam, along with the hydroxy gas that is produced. Such systems utilize a lot of energy to produce the hydroxy gas, as at least a portion of the electrical current applied to the water is used to heat the water and turn the water to steam, rather than to producing hydroxy gas. For example, existing hydroxy gas generators may require 350 W or more of power to produce 5 L/min or less of hydroxy gas. Accordingly, there exists a need to produce hydroxy gas in a manner that requires less overall energy.

Additionally, it may be beneficial to utilize hydroxy gas in an agricultural setting. For example, adding hydrogen gas to agricultural water supplies has been shown to improve seed germination, seedling growth, root elongation, and harvest freshness of crops. Furthermore, adding oxygen gas may further improve agricultural results by increasing the oxygen available to crops via the soil. Accordingly, adding hydroxy gas, which contains both hydrogen gas and oxygen gas, to agricultural water supplies may result in greater crop yields and higher-quality crops overall.

However, it may be disadvantageous to utilize existing hydroxy gas generators to create hydroxy gas for use in agricultural sites. In particular, existing hydroxy gas generators increase the temperature of the water such that the water itself and the hydroxy gas produced are at higher temperatures (e.g., 150° F. or more). To avoid damage to crops, agricultural water supplies may need to be at significantly lower temperatures (e.g., 80° F. or less). Accordingly, existing techniques for generating hydroxy gas may require the hydroxy gas itself to be cooled considerably before it can be used in an agricultural water supply. Furthermore, many agricultural settings that could benefit from water supplies containing hydroxy gas may be in remote locations, which may not have convenient or reliable access to a power grid. Therefore, hydroxy gas generators deployed in these locations may have to rely on alternative energy sources, such as wind turbines and solar panels. In such instances, excessive energy usage may reduce the overall output of hydroxy gas and/or increase the energy needs such that deploying and maintaining the alternative energy sources is unduly cumbersome and/or unsustainable.

Therefore, there exists a need to generate hydroxy gas in a manner that utilizes less energy. Such techniques may reduce the cost of generating hydroxy gas, improve the ability to generate hydroxy gas in remote environments, and improve the compatibility of the generated hydroxy gas with agricultural water supplies. One solution to this problem is to prepare the water from which hydroxy gas is extracted prior to applying an electrical charge or current to the water. In particular, the water may be prepared by reducing its surface tension and/or magnetically orienting the molecules of the water to align with the electrical current or charge that will be applied. In particular, a water structuring device may be used that reduces the surface tension of the water using one or more spheres to disrupt the flow of the water. Additionally or alternatively, the water structuring device may magnetically orient the molecules of the water by utilizing magnetically charged spheres to create a magnetic field within the water structuring device. Additionally or alternatively, hydroxy gas may be generated using a gas generation chamber configured to continuously flow water through multiple anode-cathode pairs. In particular, the anode-cathode pairs may be designed to permit the constant flow of water between the anode and cathode. Additionally, the anode and the cathode within the anode-cathode pairs may be designed to harmonically resonate (e.g., electrically resonate) at an operating frequency of the anode-cathode pairs.

Figure 1:
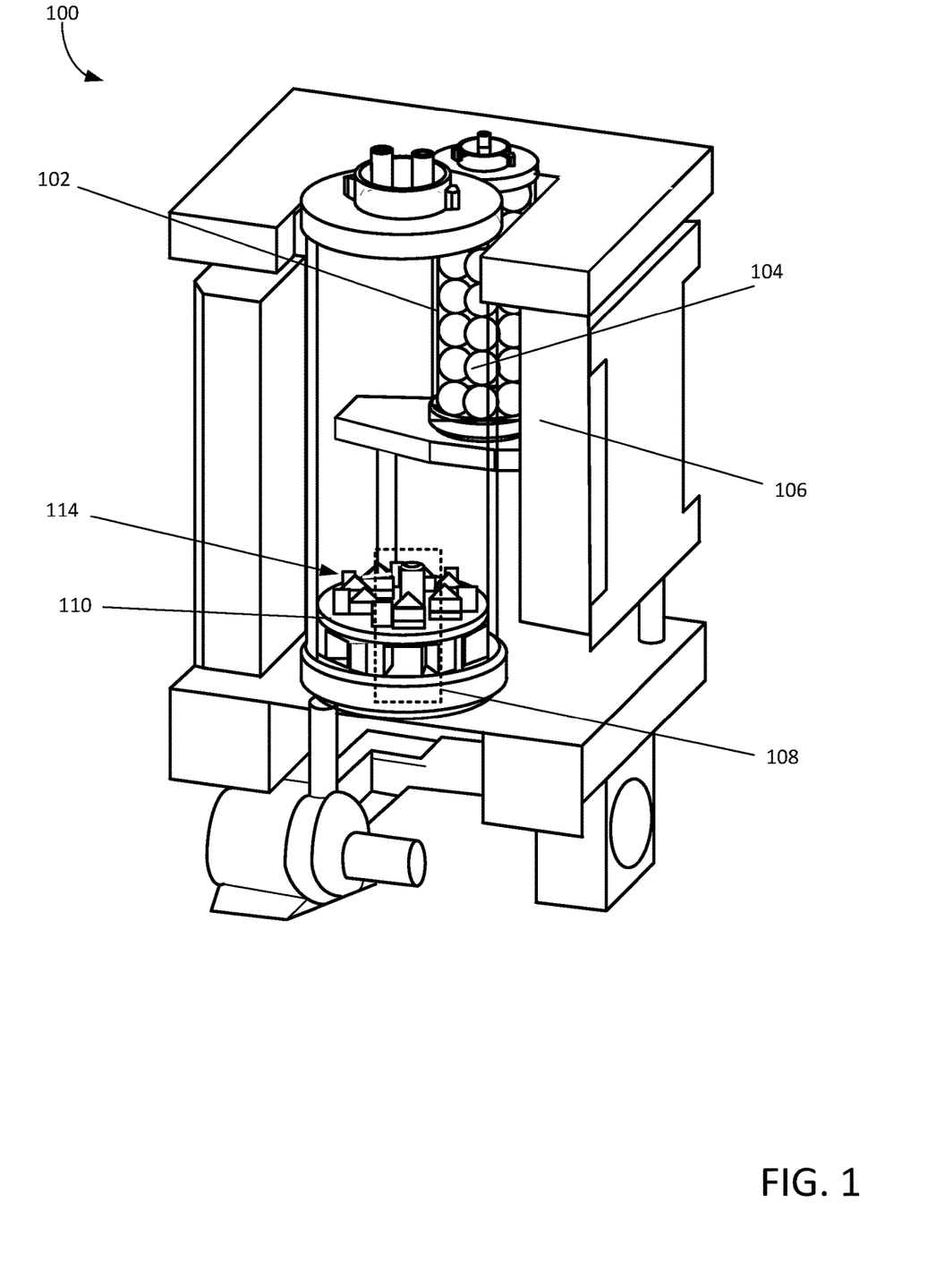
FIG. 1 illustrates a hydroxy gas generator according to an exemplary embodiment the present disclosure.

FIG. 1 illustrates a hydroxy gas generator 100 according to an exemplary embodiment the present disclosure. The hydroxy gas generator 100 may be configured to generate hydroxy gas from a supply of water. In particular, the hydroxy gas generator 100 may be configured to generate hydroxy gas in a more efficient manner, thereby reducing the overall required energy. For example, the hydroxy gas generator 100 may be configured to generate hydroxy gas by reducing the surface tension of the water from which the hydroxy gas is generated, magnetically orienting molecules of the water, and/or using harmonically-tuned anodes and cathodes to apply electrical currents to the water.

The hydroxy gas generator 100 includes a gas generation chamber 102, a water structuring device 104, a gas isolation system 106. As explained further below, the water structuring device 104 may be configured to receive water from the gas generation chamber. In particular, the water structuring device 104 may be configured to reduce the surface tension of the received water utilizing multiple spheres contained within the water structuring device 104. The spheres may create small vortexes in the water as the water flows, which may reduce the surface tension of the water. Furthermore, the spheres may create a magnetic field that magnetically orients the molecules of the water. In certain implementations, the water structuring device 104 may provide the water to a water chiller that cools the water from the water structuring device 104. For example, the water may be cooled by the water chiller to a temperature of 70° F. or less (e.g., 60° F. or less, 55° F. or less, 50° F. or less).

The gas generation chamber 102 may store a supply of water used to generate hydroxy gas. The gas generation chamber 102 may store the water that is received by the water structuring device 104. In particular, the gas generation chamber 102 includes multiple anode-cathode pairs 108 (only a subset of which are numbered in FIG. 1), which may be configured to generate the hydroxy gas. In particular, the anode-cathode pairs 108 may apply electrical charge or current to the water to generate the hydroxy gas. The anode-cathode pairs are arranged at a bottom end 114 of the gas generation chamber 102. In particular, the anode-cathode pairs 108 are arranged within a support bracket 110, which may be configured to support the anode-cathode pairs 108 and to seal the bottom end 114 of the gas generation chamber 102 such that water received at the bottom end 114 of the gas generation chamber 102 (e.g., received from the water structuring device 104 and/or the water chiller) flows through the anode-cathode pairs 108.

The gas isolation system 106 may be configured to extract the hydroxy gas. For example, the hydroxy gas may be generated as bubbles (e.g., microbubbles) within the water of the gas generation chamber 102 and the bubbles may create mist as they leave the water within the gas generation chamber 102. In particular, the gas isolation system 106 may include fibrous materials configured to separate and extract gaseous bubbles within the mist (e.g., by agitation). In particular, the fibrous materials may be made from metallic compounds, such as titanium and/or steel. In certain implementations, the gas isolation system 106 may include multiple chambers (e.g., four chambers) and the mist received from the gas generation chamber 102 may pass through each of the multiple chambers to extract the hydroxy gas. For example, the chambers may be filled with increasing densities of fibrous materials and the mist may pass from the chamber with the lowest density of fibrous materials through to the chamber with the highest density of fibrous materials.

Once extracted from the mist, the hydroxy gas may be prepared for storage. Because of its flammable nature, the hydroxy gas may be combined with water or other liquids during storage. For example, the hydroxy gas may be combined with water from another source (e.g., a secondary source of water) at a water recombination system. The combined water and hydroxy gas (e.g., oxygenated and hydrogenated water) may be routed to a storage tank. In certain implementations, water may be extracted from the storage tank for use at an agricultural site. For example, the oxygenated and hydrogenated water in the storage tank may be extracted and used to water one or more crops.

It should also be appreciated that the hydroxy gas and any liquid containing the hydroxy gas may be stored for future use in other applications. For example, the hydroxy gas may be extracted from the liquid and used in industrial applications, such as fuel (e.g., for generators, for boiling water). In still further implementations, the hydroxy gas may be used in certain medical applications. For example, oxygenated water and/or water containing hydroxy gas may be used to relieve or treat dry eye conditions. Also, hydroxy gas may be used (e.g., ignited to form a plasma flame) to treat and dispose of solid waste (e.g., solid biological waste from humans and/or animals). In still further implementations, producing hydroxy gas may result in high concentrations of hydrogen in the water (e.g., within the anode-cathode pairs). In such conditions, certain types of hydrogen oxidizing bacteria (e.g., knallgas bacteria) in the regions of the hydroxy gas generator 100 that experience high concentrations of hydrogen. Accordingly, the hydroxy gas generator 100 may similarly be used to produce hydrogen oxidizing bacteria. For example, water contained within the gas generation chamber may contain hydrogen oxidizing bacteria and the water may be extracted to receive and utilize the hydrogen oxidizing bacteria.

Figure 2:
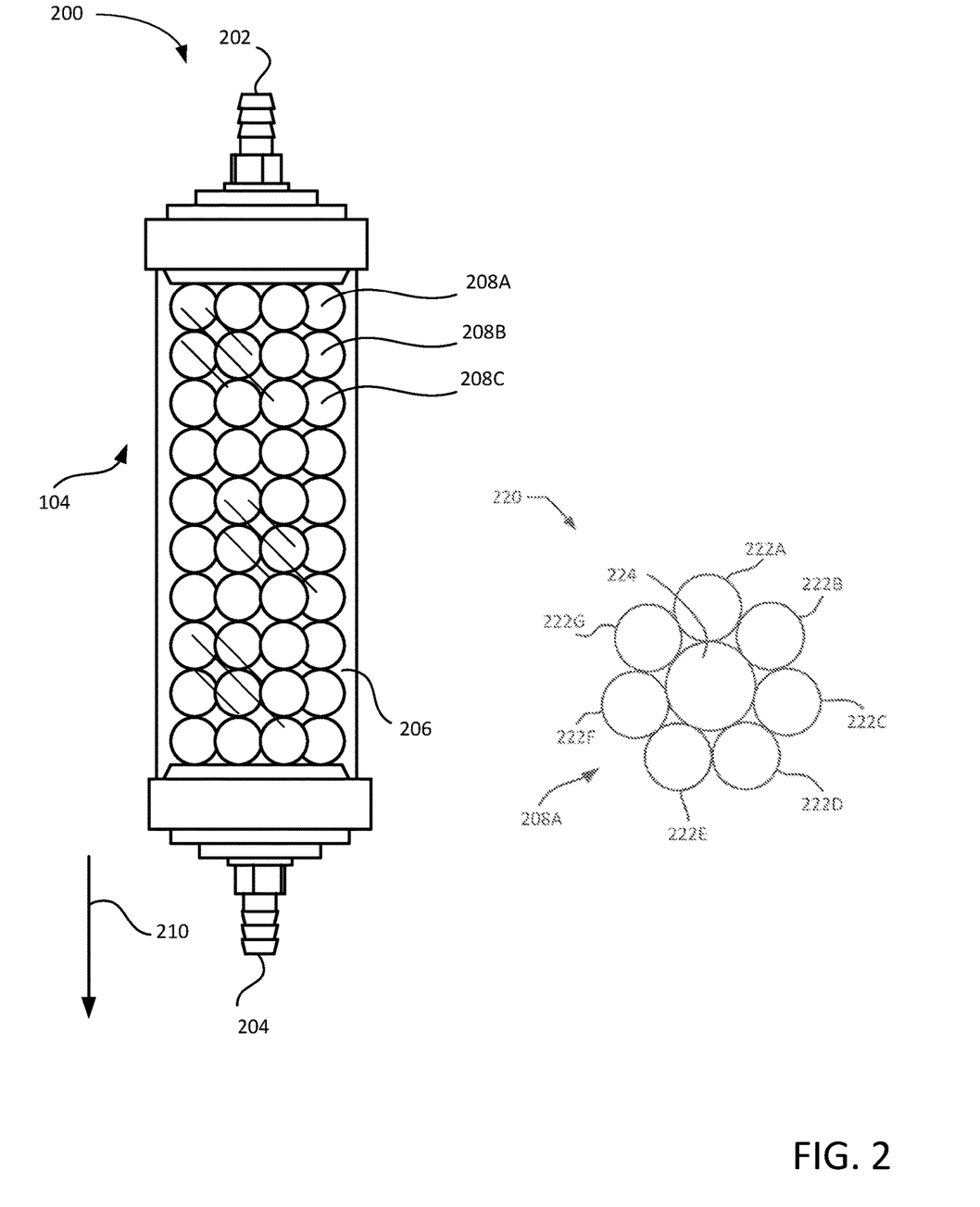
FIG. 2 illustrates views of a water structuring device according to an exemplary embodiment of the present disclosure.

FIG. 2 illustrates views 200, 220 of the water structuring device 104 according to an exemplary embodiment of the present disclosure. The water structuring device 104 includes an inlet 202 and an outlet 204. Water may be received at the inlet 202 (e.g., from the gas generation chamber) and may flow along the direction 210. Water may exit the water structuring device 104 at the outlet 204 (e.g., to proceed to a water chiller and/or anode-cathode pairs 114 in the gas generation chamber 102). The water structuring device 104 also includes an exterior housing 206, which may contain the water as it flows from the inlet 202 to the outlet 204. In certain implementations, the exterior housing 206 of the water structuring device 104 may have a length of 8 inches and an interior diameter of 2 inches. It should be appreciated that, in other implementations (e.g., implementations to produce more hydroxy gas or less hydroxy gas), the dimensions of the water structuring device 104 may differ.

Between the inlet 202 and the outlet 204, the water structuring device 104 includes multiple rings 208A-C (only a subset of which are numbered for clarity) that are centrally aligned along a direction of flow 210 of water through the water structuring device 104. The rings 208A-C each include multiple spheres. For example, and as depicted in the view 220, the ring 208A includes seven spheres 222A-G arranged around a solid rod 224, which may run through the middle of the water structuring device 104. The solid rod 224 may be made from any solid material, such as glass, plastic (e.g., Delrin® plastic), metal, and the like. Each of the rings 208A-C may similarly include seven spheres. As depicted, the water structuring device 104 includes 11 rings 208A-C. Each of the rings 208A-C is aligned such that the spheres in one ring 208A align with the spheres of another ring 208B. In additional or alternative implementations, the rings 208A-C may be staggered such that the spheres of one ring 208A align between the spheres of another ring 208B.

The rings 208A-C and the spheres 222A-G may be arranged as described above to agitate the flow of the water through the water structuring device 104. In particular, the rings 208A-C and the spheres 222A-G may create vortexes within the water as it flows through the water structuring device 104, which may reduce the surface tension of the water. Reducing the surface tension of the water in this way may be beneficial within the gas generation chamber 102. In particular, water with a lower surface tension may increase the likelihood that hydroxy gas generated within the water is produced as microbubbles (e.g., bubbles less than or equal to 2 mm in size, bubbles less than or equal to 1 mm in size, bubbles less than or equal to 0.5 mm in size).

In certain implementations, the spheres 222A-G may be 0.25-1.5 inches in diameter (e.g., 0.5 inches), although other implementations are possible. Furthermore, the spheres 222A-G may be magnetically charged. For example, the spheres 222A-G may be created from a magnetic material, such as a rare earth magnetic material (e.g., neodymium) and the like. In certain implementations, the spheres 222A-G may have a magnetic field of 0.5-2 Tesla or more (e.g., at least 1.0 Tesla Gauss). In certain instances, the spheres 222A-G may also be gold plated.

Magnetically-charged spheres 222A-G may combine to produce a magnetic field within the water structuring device 104. In particular, the magnetic field produced by the spheres 222A-G may serve to magnetically orient the molecules of the water as the water passes through the water structuring device 104. For example, the magnetic fields of the spheres 222A-G may be aligned or configured to align the molecules of the water with the charge of the anode-cathode pairs 108 within the gas generation chamber. As a specific example, the magnetic fields of the spheres 222A-G may be aligned perpendicular to the direction 210 of water flowing through the water structuring device 104. Orienting the molecules of the water in this way may improve the overall generation of hydroxy gas from the water. In particular, where the molecules of the water are already aligned with the electric field in the anode-cathode pairs 108, less energy may be consumed reorienting the molecules and more of the energy may instead be used to separate the molecules within the water, thereby generating the hydroxy gas. In this way, the magnetically-charged spheres 222A-G may reduce the overall energy consumed by the hydroxy gas generator 100.

In the above-discussed examples, the water structuring device is described as including 11 rings 208A-C, which each contain seven spheres 222A-G. However, it should be understood that additional or alternative implementations may differ from those discussed above and depicted in FIG. 2. For example, additional or alternative implementations may include more rings (e.g., 15 rings, 20 rings) or fewer rings (e.g., five rings, 10 rings). As another example, certain implementations may include fewer spheres in each ring (e.g., four spheres, six spheres) or more spheres in each ring (e.g., eight spheres, 10 spheres). Furthermore, certain implementations may include a different number of spheres in each ring. For example, half of the rings may include five spheres and half of the rings may include eight spheres. All such implementations are hereby considered within the scope of the present disclosure.

Figure 3:
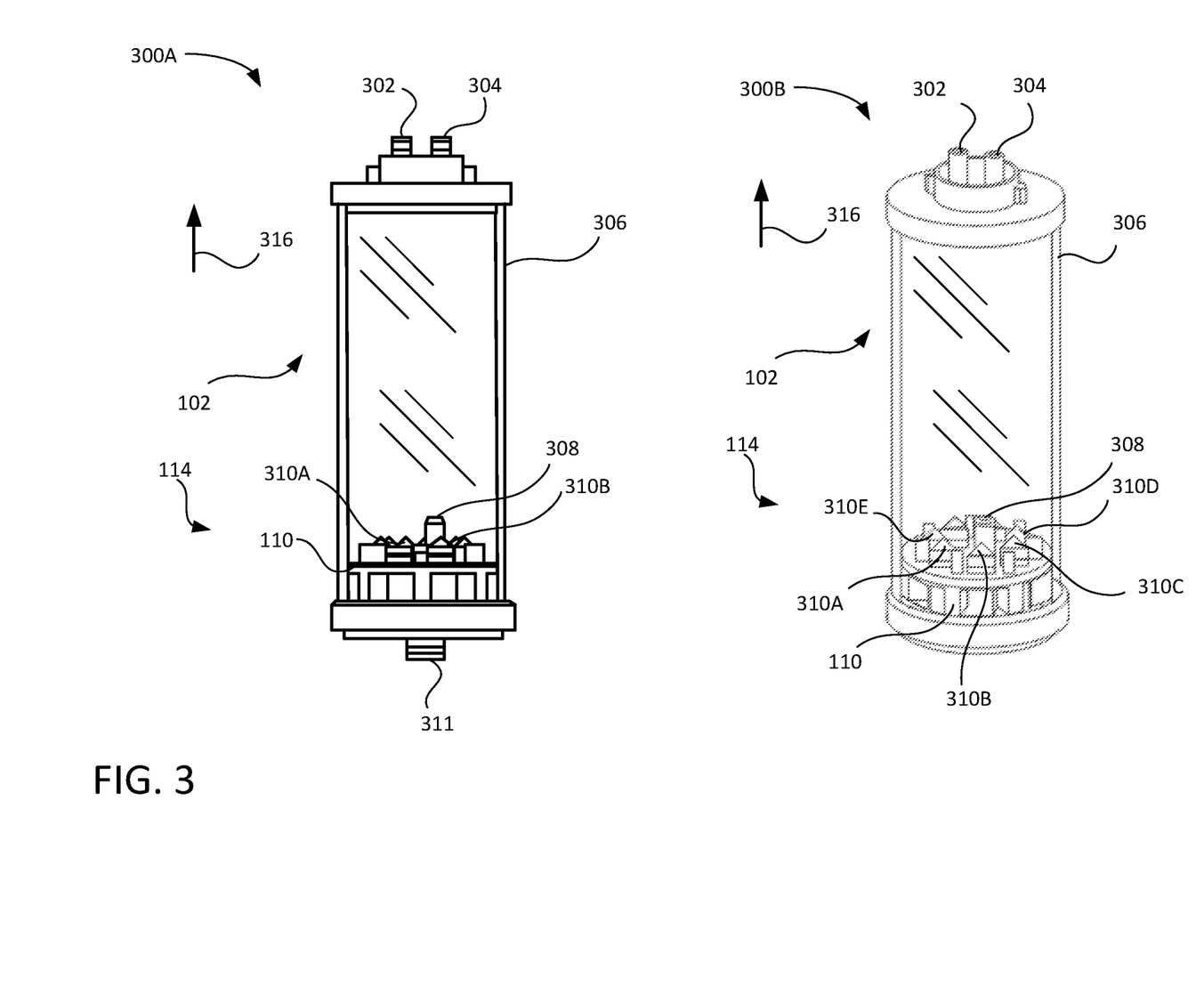
FIG. 3 illustrates views of a gas generation chamber according to an exemplary embodiment of the present disclosure.

FIG. 3 illustrates views 300A-B of the gas generation chamber 102 according to an exemplary embodiment of the present disclosure. In particular, FIG. 3 illustrates a side view 300A of the gas generation chamber 102 and a perspective view 300B of the gas generation chamber 102. The gas generation chamber 102 includes an exterior housing 306, an inlet 302, and an outlet 304 at one end of the exterior housing 306. The inlet 302 may be used to fill the gas generation chamber 102 (e.g., a water supply portion of the gas generation chamber 102) with water that will be used to generate hydroxy gas. For example, the gas generation chamber 102 may be emptied and refilled with water on a regular basis (e.g., every month, three months, six months). Hydroxy gas that is generated may be extracted via the outlet 304 (e.g., may be extracted as mist). As explained above, the gas generation chamber 102 also includes a support bracket 110 at a bottom end 114 of the gas generation chamber 102 (e.g., at a bottom end 114 of the gas chamber 102 at the opposite end of the exterior housing 306 from the inlet 302 and the outlet 304). The support bracket 110 includes multiple anode-cathode pairs 310A-E, which may be the same as the anode-cathode pairs 108 discussed above in connection with FIG. 1. As explained further herein, the anode-cathode pairs 310A-E may be configured to generate hydroxy gas from the water by applying an electrical charge or current to the water. In particular, the gas generation chamber 102 may be configured to continuously flow water through the anode-cathode pairs 310A-E in the direction 316. In particular, the gas generation chamber 102 includes an inlet 311 at the bottom end 114 and may continuously receive water via the inlet 311. The water received via the inlet 311 may continuously flow through the anode-cathode pairs 310A-E. Furthermore, the gas generation chamber 102 includes an outlet 308 at the bottom end 114. The outlet 308 may be configured to receive water from the water supply portion of the gas generation chamber 102. Water received by the outlet 308 may be provided to the water structuring device 104.

In certain implementations, the exterior housing 306 of the gas generation chamber 102 may have a length of 14 inches and an interior diameter of 4 inches. It should be understood that other implementations of the gas generation chamber 102 may have different dimensions. For example, larger gas generation chambers 102 may be used to increase the amount of water stored in the water supply portion and/or to increase the number of anode-cathode pairs used to generate hydroxy gas. As another example, smaller gas generation chambers 102 may be used to reduce the overall size of the hydroxy gas generators 100 (e.g., where production of less hydroxy gas is required.

Figure 4:
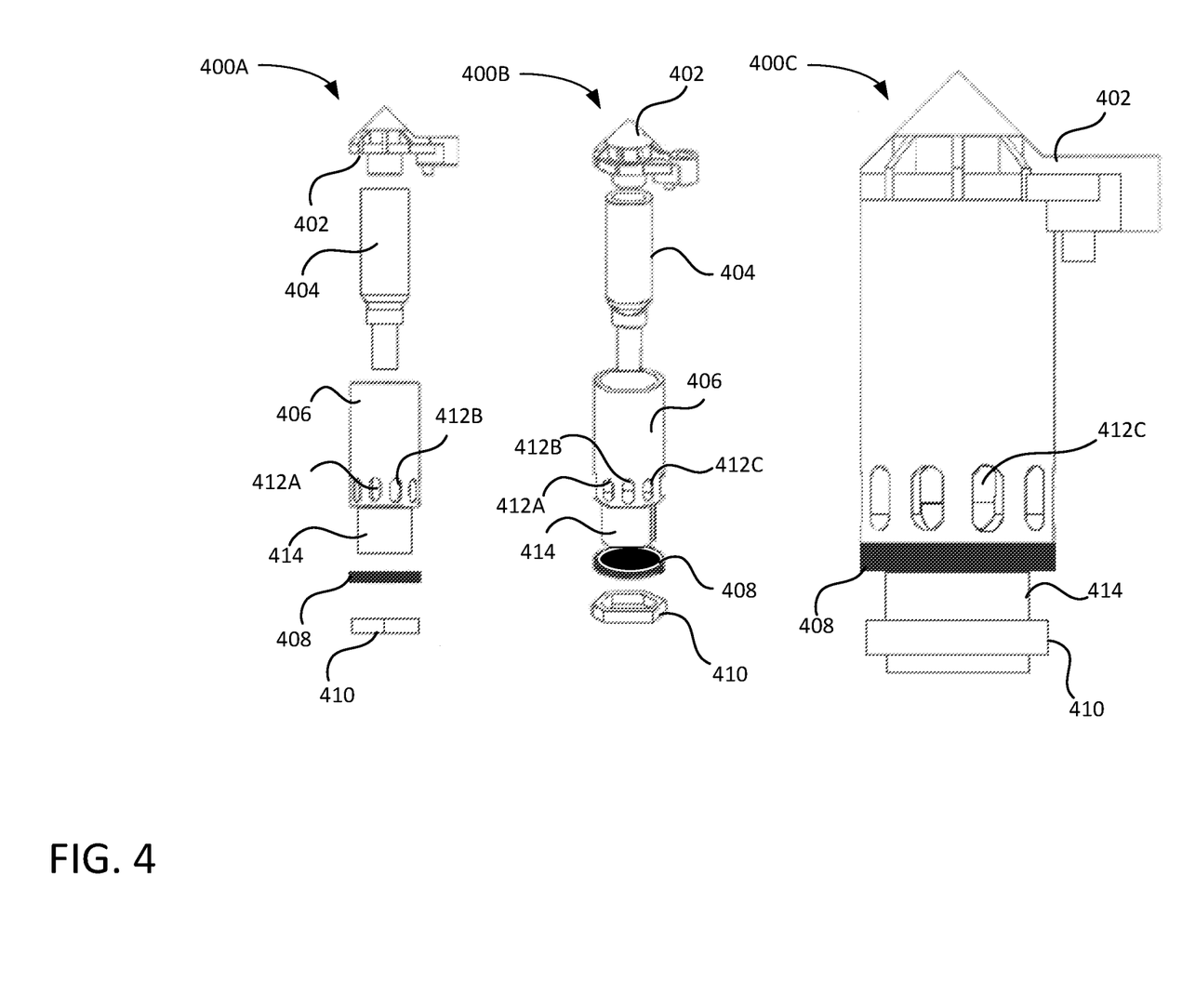
FIG. 4 illustrates views of an anode-cathode pair according to an exemplary embodiment of the present disclosure.

FIG. 4 illustrates views 400A-C of an anode-cathode pair 450 according to an exemplary embodiment of the present disclosure. In particular, FIG. 4 illustrates a side view 400A of the anode-cathode pair 450 when disassembled, a perspective view 400B of the anode-cathode pair 450 when disassembled, and a side view 400C of the anode-cathode pair 450 when assembled. The anode-cathode pair 450 includes a cap 402, a cathode 404, and an anode 406. The cathode 404 and the anode 406 extend from an inlet end of the anode-cathode pair 450 to an outlet end of the anode-cathode pair 450 along a direction of flow for water through the anode-cathode pair 450. Additionally, the anode 406 is positioned radially exterior to the cathode 404 and forms the exterior of the anode-cathode pair 450 as depicted. In operation, the anode 406 may be negatively charged and the cathode 404 may be positively charged. In particular, the anode 406 and the cathode 404 may be powered and charged to operate at a predetermined frequency. For example, the predetermined frequency may, in certain implementations, be from 200-400 Hz (e.g., 300 Hz). Additionally or alternatively, the anode-cathode pair 450 may be controlled to operate at a predetermined voltage (e.g., a predetermined voltage of 35-55 V, such as 48 V). The anode-cathode pair 450 may also be controlled to operate at a desired current, such as 5-10 A (e.g., 7 A).

Furthermore, in certain implementations, the anode 406 and the cathode 404 may be tuned to harmonically match one another. In particular, the anode 406 and the cathode 404 may be harmonically tuned to have an electrical resonant frequency at the operating frequency (e.g., 300 Hz). To harmonically tune the anode 406 and the cathode 404, the impedance (i.e., resistance, capacitance, and/or inductance) of the anode 406 and the cathode 404 may be adjusted by varying one or more dimensions of the anode 406 and the cathode 404. For example, one or more of the length, diameter, and/or thickness of the anode 406 and the cathode 404 may be selected to achieve the desired harmonic resonant frequency. In certain preferred implementations, the anode 406 may have a length of 1.5-2 inches (in) (e.g., 1.8 in), a maximum diameter of 0.5-1 in (e.g., 0.75 in), and a thickness of 0.1-0.2 in (e.g., 0.17 in). The cathode 404 may have a length of 1.75-2.25 in (e.g., 1.9 in), a maximum diameter of 0.25-0.75 in (e.g., 0.5 in), and a thickness of 0.1-0.2 in (e.g., 0.14 in). Furthermore, the material used to construct the anode 406 and the cathode 404 may be selected to achieve the desired impedance. In particular, in certain implementations, the anode 406 and the cathode 404 may be constructed from stainless steel, titanium, and the like. In preferred implementations, the anode 406 and the cathode 404 may be electropolished. For example, the anode 406 and the cathode 404 may be made from electropolished stainless steel. It should also be noted that, in certain implementations, the anode 406 and cathode 404 may be made from the same material, as in the above-discussed examples. However, in additional or alternative implementations, the anode 406 may be made from a different material than the cathode 404.

The cap 402 may be positioned at the top of the anode-cathode pair 450. In particular, the cap 402 may be fastened to the interior of the cathode 404. The cap 402 may be positioned to direct flow of water evenly as the water exits the anode-cathode pair 450 As depicted, the cap 402 is jetted in design. In particular, the cap 402 is cone-shaped with a solid tip and with vertical fins evenly distributed angularly around the solid tip. This design may serve to ensure that water flows evenly and continuously out of the anode-cathode pair 450.

The anode 406 also includes aeration holes 412A-C. The aeration holes may be positioned at a bottom end of the anode 406. In particular, the aeration holes 412A-C may be positioned such that water received from the water structuring device 104 passes into the anode-cathode pair 450 (e.g., between the anode 406 and the cathode 404) through the aeration holes 412A-C. In particular, by allowing the water to flow smoothly, the aeration holes 412A-C may reduce the temperature of the water as it enters the anode-cathode pair 450. The aeration holes 412A-C may have a height of 0.1-0.2 inches (e.g., 0.2 in) and a width of 0.1-0.2 in (e.g., 0.13 in). Furthermore, as hydroxy gas is generated within the anode-cathode pair 450, bubbles of the hydroxy gas may collect on the anode 406 (e.g., an inner surface of the anode 406) and the cathode 404 (e.g., an outer surface of the cathode 404). A continuous flow of water through the anode-cathode pair 450, as enabled by the cap 402 and the aeration holes 412A-C, may allow the continuously-flowing supply of water to dislodge bubbles of hydroxy gas that collect on the anode 406 and the cathode 404. Removing the bubbles in this way may improve the yield of hydroxy gas and/or reduce the amount of energy required to produce hydroxy gas, as new bubbles of hydroxy gas may form faster along the anode 406 and the cathode 404 as bubbles are removed by the continuously-flowing supply of water.

In previous systems, bubbles of the hydroxy gas may have been dislodged from the anode-cathode pairs using pulse width modulation (PWM) current signals. Specifically, PWM signals may have been applied to the anode-cathode pairs, causing the hydroxy gas bubbles to dislodge from the anode-cathode pairs. Furthermore, prior hydroxy gas generators configured to produce hydroxy gas for industrial applications may have been principally concerned with increasing the density of hydroxy gas. Accordingly, such systems would have avoided continuously-flowing water, which would dilute the overall density of hydroxy gas within the water. However, because the hydroxy gas generator 100 may be producing hydroxy gas for use on agricultural sites or other remote locations with reduced energy availability, dilution of the hydroxy gas within water may be less of a concern. Therefore, continuously-flowing water may be advantageously utilized in the hydroxy gas generator 100 to reduce the overall energy required to produce the hydroxy gas.

At the bottom end of the anode-cathode pair 450 is a seal 408 and a nut 410. The seal 408 may be positioned at a bottom end 414 of the anode 406 to direct the flow of water from the water structuring device 104 through the aeration holes 412A-C. In certain implementations, the bottom end 414 of the anode 406 may be threaded (e.g., on an exterior surface of the bottom end 414). In such implementations, the nut 410 may similarly be threaded (e.g., on an interior surface) and may be fastened to the anode-cathode pair 450 by attaching the nut 410 to the threaded portion. In particular, the nut 410 may be tightened to attach the seal 408 to the cathode 404, thereby sealing the anode-cathode pair 450 as discussed above. In certain implementations, the nut 410 may contain a wire insert. In particular, the wire insert may run to a control system for the hydroxy generator 100. In such instances, the wire insert may receive electrical current from the control system, which may be used to charge the anode 406 and/or the cathode 404 to operate the anode-cathode pair 450 to generate hydroxy gas as discussed above (e.g., at the predetermined voltage, the predetermined current, and/or the predetermined frequency). Such implementations may simplify the construction of the anode-cathode pair 450, reducing the total number of parts and potential points of failure for the anode-cathode pair 450. Accordingly, such implementations may result in a more reliable and less error prone anode-cathode pair 450.

Figure 5:
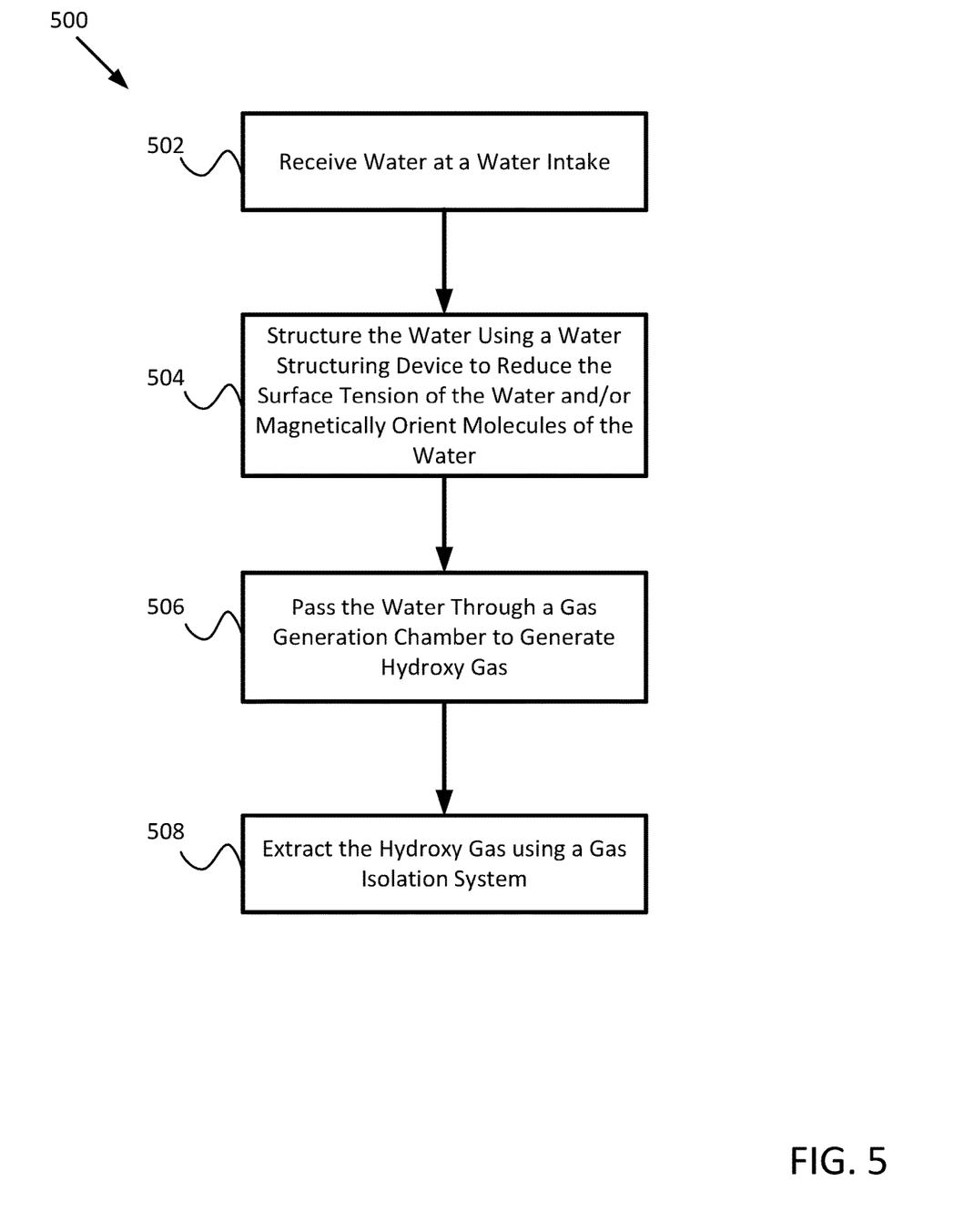
FIG. 5 illustrates a method according to an exemplary embodiment of the present disclosure.

FIG. 5 illustrates a method 500 according to an exemplary embodiment of the present disclosure. The method 500 may be performed to generate hydroxy gas. For example, all or part of the method 500 may be performed by the hydroxy gas generator 100 to generate hydroxy gas. Although the examples discussed below are described with reference to the flowchart illustrated in FIG. 5, many other methods of performing the acts associated with FIG. 5, may be used. For example, the order of some of the blocks may be changed, certain blocks may be combined with other blocks, one or more of the blocks may be repeated, and some of the blocks described may be optional.

The method 500 may begin with receiving water at a water intake (block 502). For example, the hydroxy gas generator 100 may receive water at a water intake. In certain implementations, the water may be received at a water structuring device 104, such as from the water supply portion of a gas generation chamber 102. In certain implementations, the water may be filtered or otherwise prepared at the water intake. For example, prior to being received at the water chiller, water may flow through a filter to remove debris, deposits, or other compounds.

A water structuring device may be used to structure the water (block 504). For example, the water structuring device 104 may structure the water to reduce the surface tension of the water and/or to magnetically orient the molecules of the water. As explained above, the water structuring device 104 may include spheres 222A-G arranged (e.g., arranged in rings 208A-C) to agitate the flow of water through the water structuring device 104. Agitating the flow of water in this way may reduce the overall surface tension of the water. In particular, the water structuring device 104 may be configured to reduce the surface tension of the water by at least 10-40% (e.g., preferably by 20% or more, more preferable by 25% or more). Water with reduced surface tension may have weaker bonds between the molecules of water. Accordingly, generating hydroxy gas using water with lower surface tension may be more energy efficient, as less energy is required to break the bonds between the molecules of water. Additionally, water with lower surface tension may be more prone to generating hydroxy gas as microbubbles, which may be advantageous because microbubbles may be easier to extract from water contained within the gas generation chamber and may leave the water containing less moisture (e.g., less of a mist) than larger bubbles of hydroxy gas. This may improve the overall yield of hydroxy gas, as less hydroxy gas is lost during subsequent processing (e.g., within the gas isolation system 106). Furthermore, the spheres 222A-G may be magnetically charged and may, in combination generate a magnetic field within the water structuring device 104. The magnetic field may orient the molecules of the water as it passes through the water structuring device 104. As explained above, orienting the molecules of the water in this way may reduce the overall energy required to generate hydroxy gas within the anode-cathode pairs 108, 310A-E, 450.

The water may be passed through a gas generation chamber 102 to generate hydroxy gas (block 506). In particular, the gas generation chamber 102 may contain anode-cathode pairs 108, 310A-E, 450, which may be configured to apply an electrical charge or current to a continuously-flowing supply water from the water structuring device 104 as the water passes through the anode-cathode pairs 108, 310A-E, 450. The electrical charge may separate the water molecules to form hydroxy gas (e.g., bubbles or microbubbles of hydroxy gas) within the water between the anode 406 and the cathode 404 of the anode-cathode pairs 108, 310A-E, 450. Furthermore, the gas generation chamber 102 may be configured to allow for continuous flow of the water through the anode-cathode pairs 108, 310A-E, 450. In particular, the gas generation chamber may include an outlet 308 and an inlet 311 that are used to recirculate water from a water supply portion of the gas generation chamber 102, through the water structuring device 104, and into the anode-cathode pairs 108, 310A-E, 450. Furthermore, to facilitate the continuous flow of water through the gas generation chamber 102, the anode-cathode pairs 108, 310A-E, 450 may contain aeration holes 412A-C, as explained above.

The hydroxy gas may be extracted using a gas isolation system (block 508). For example, the hydroxy gas may be extracted from the outlet 304 as mist leaving the surface of the water within the gas generation chamber 102. Within the gas isolation system 106, the mist may flow through one or more chambers of fibrous materials configured to separate the hydroxy gas from the moisture within the mist Once extracted, the hydroxy gas may be combined with another liquid at a water recombination system and may be stored for future use. Additionally or alternatively, the hydroxy gas may be combined with an agricultural water supply and may be used at an agricultural site (e.g., for watering crops). In particular, the hydroxy gas may be combined with a secondary supply of water to generate oxygenated and hydrogenated water. The oxygenated and hydrogenated water may be used at the agricultural site or may be used for another application, such as a medical application (e.g., treating dry eyes), or any other application discussed herein.

Performing the method 500 may enable the generation of hydroxy gas with increased efficiency. In particular, generating hydroxy gas using the method 500 may reduce the overall energy required to generate hydroxy gas. For example, the hydroxy gas generator 100 may generate 12 L/min of hydroxy gas when operating at, 350 W, as compared to 5 L/min for existing systems. This improved yield may reduce the overall energy required to produce hydroxy gas, enabling generation of hydroxy gas in remote locations (e.g., in remote agricultural sites). Accordingly, these techniques may enable hydroxy gas generators 100 to be powered using alternative energy supplies, such as solar panels and wind turbines. Additionally, because less energy may be required to produce hydroxy gas according to the method 500, these techniques may reduce the overall cost of generating hydroxy gas.

Figure 6:
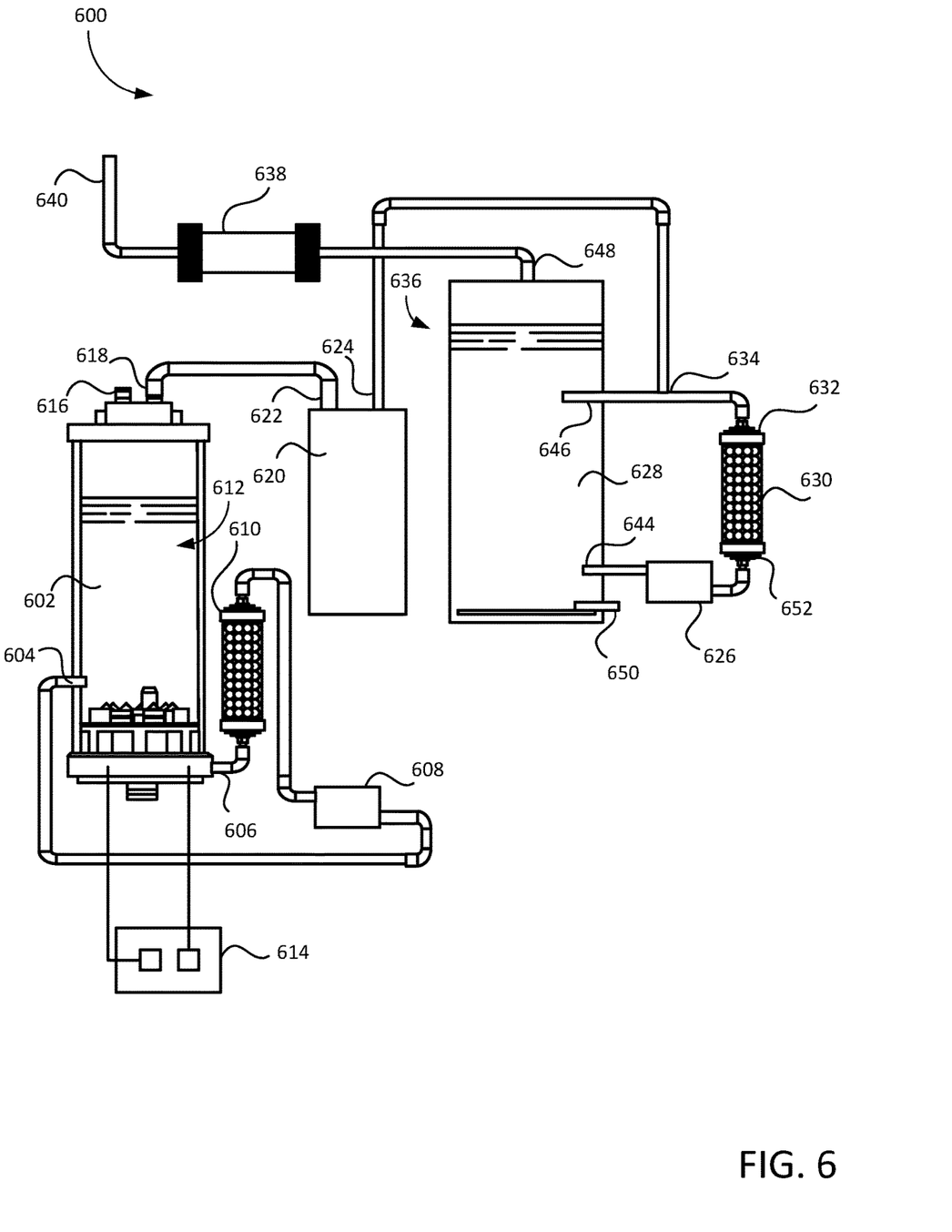
FIG. 6 illustrates a system for generating hydroxy gas according to an exemplary embodiment of the present disclosure.

FIG. 6 illustrates a system 600 for generating hydroxy gas according to an exemplary embodiment of the present disclosure. The system 600 may be an exemplary implementation of the hydroxy gas generator 100. For example, the system 600 as illustrated in FIG. 6 may be a conceptual view of the hydroxy gas generator 100 and related components, separated to better illustrate the flow of hydroxy gas and water through the hydroxy gas generator 100. The system 600 includes a gas generation chamber 612, a water structuring device 610, a gas isolation system 620, and a gas storage tank 636. The gas generation chamber 612 may be an exemplary implementation of the gas generation chamber 102, the water structuring device 610 may be an exemplary implementation of the water structuring device 104, and the gas isolation system 620 may be an exemplary implementation of the gas isolation system 106.

The gas generation chamber 612 stores water 602, which may be received at the inlet 616 of the gas generation chamber 612 (which may be an exemplary implementation of the inlet 302). The water 602 may be circulated through anode-cathode pairs 642 located at the bottom of the gas generation chamber 612. For example, water may be extracted from the outlet 604 located above the anode-cathode pairs 642 (which may be an exemplary implementation of the outlet 308) and may be pumped by the pump 608 into the inlet 606 located beneath the anode-cathode pairs 642 (which may be an exemplary implementation of the inlet 311). In particular, the water 602 circulated between the outlet 604 and the inlet 606 may be pumped through the water structuring device 610 (e.g., to lower the surface tension and/or to magnetically orient the molecules of the water). After exiting the inlet 606, the water 602 may pass through the anode-cathode pairs 642, generating hydroxy gas as discussed above. In certain implementations, a chiller may be used to cool the water 602 before it passes through the anti-cathode pairs. In such implementations, the chiller may be located between the inlet 606 and the inter-cathode pairs 642. The inter-cathode pairs 642 may be powered by a power system 614 (e.g., a battery).

The hydroxy gas may be generated as microbubbles within the water 602 as the water 602 passes through the anode-cathode pairs 642. Once generated, the hydroxy gas may float to the top of the gas generation chamber 612, where the hydroxy gas may be extracted from the gas generation chamber 612 via the outlet 618. When extracted, the hydroxy gas may include excess moisture (e.g., mist from the water 602 created as the hydroxy gas bubbles leave the water 602). Accordingly, the hydroxy gas may be passed through the gas isolation chamber 620, which may remove excess moisture, as discussed above. The hydroxy gas may then proceed out of an outlet 624 of the gas isolation chamber 620 and into an inlet pipe 634 of an aerator 630 (e.g., a water recombination system). The aerator 632 may be connected to the storage tank 636, which may store water 628 containing hydroxy gas (e.g., hydrogenated and oxygenated water). The hydroxy gas generated within the gas generation chamber 612 may be combined with the water 628 for safe storage of the hydroxy gas. In particular, the aerator 630 may be configured to mix water 628 from the storage tank 636 with hydroxy gas received at the inlet pipe 634. For example, the aerator 630 may be a Venturi aerator configured to receive hydroxy gas from the inlet pipe 634 at an inlet 632 to receive water 628 at the inlet 652. For example, the pump 626 may expect water from an outlet 644 of the storage tank 636 and may pump the water 628 through the aerator 630 and into the inlet 646 of the storage tank 636. The water 628 may be mixed by the aerator 630 with the hydroxy gas received at the inlet 632, thereby allowing the hydroxy gas to be safely stored within the water 628 of the storage tank 636. For example, in certain implementations, hydroxy gas may be stored within the water 628 at a concentration of 30 ppm or more (e.g., preferably may be stored at 50 ppm).

The hydroxy gas and/or the water 628 may be extracted from the storage tank 636 for further use. For example, water 628 containing the hydroxy gas (e.g., hydrogenated and oxygenated water) may be extracted from the outlet 650 of the storage tank 636 (or an outlet located in another part of the storage tank 636) for further use (e.g., for use at an agricultural site, for use in a medical application). Additionally or alternatively, hydroxy gas to be extracted from the outlet 648 for use in an industrial application. For example, as depicted, the hydroxy gas may be extracted for use in generating a plasma flame 640 after passing through a flashback arrestor 638. Additionally or alternatively, the hydroxy gas may be used as fuel for industrial applications (e.g., to fuel a generator).

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A hydroxy gas generator, comprising:
a gas generation chamber containing water;
a plurality of anode-cathode pairs within the gas generation chamber configured to generate hydroxy gas using a continuously-flowing supply of water;
a water structuring device configured to (i) reduce the surface tension of the continuously-flowing supply of water and (ii) magnetically orient molecules of the continuously-flowing supply of water; and
a gas isolation system for extracting hydroxy gas from the gas generation chamber.

2. The hydroxy gas generator of claim 1, wherein the water structuring device reduces the surface tension of the continuously-flowing supply of water by causing the water to flow through a plurality of spheres.

3. The hydroxy gas generator of claim 2, wherein the plurality of spheres reduce the surface tension of the continuously-flowing supply of water by creating vortexes within the continuously-flowing supply of water.

4. The hydroxy gas generator of claim 2, wherein at least a subset of the plurality of spheres have a diameter of at least 0.4 inches.

5. The hydroxy gas generator of claim 2, wherein the plurality of spheres create magnetic fields that magnetically orient the molecules of the water.

6. The hydroxy gas generator of claim 5, wherein the plurality of spheres are charged with a magnetic field of at least 1 Tesla.

7. The hydroxy gas generator of claim 2, wherein at least a subset of the plurality of spheres are gold plated.

8. The hydroxy gas generator of claim 1, wherein the surface tension of the continuously-flowing supply of water is reduced by at least 20%.

9. The hydroxy gas generator of claim 1, wherein the gas generation chamber includes at least 7 anode-cathode pairs.

10. The hydroxy gas generator of claim 1, wherein the plurality of anode-cathode pairs are harmonically tuned to have an electrical resonant frequency at a predetermined frequency.

11. The hydroxy gas generator of claim 10, wherein the predetermined frequency is between 200-400 Hz.

12. The hydroxy gas generator of claim 1, wherein the plurality of anode-cathode pairs operate at a predetermined voltage of 30-60 V.

13. The hydroxy gas generator of claim 1, wherein the plurality of anode-cathode pairs have jetted caps.

14. The hydroxy gas generator of claim 1, wherein the anodes of the plurality of anode-cathode pairs include aeration holes where the continuously-flowing supply of water is received.

15. The hydroxy gas generator of claim 1, wherein the hydroxy gas is generated as microbubbles within the water.

16. The hydroxy gas generator of claim 1, further comprising a water chiller for reducing the temperature of the continuously-flowing supply of water.

17. The hydroxy gas generator of claim 16, wherein the water chiller reduces the temperature of the continuously-flowing supply of water to 65° F. or less.

18. The hydroxy gas generator of claim 16, wherein the continuously-flowing supply of water proceeds through the water chiller prior to entering the anode-cathode pairs.

19. The hydroxy gas generator of claim 1, further comprising a water recombination system for combining the hydroxy gas with a secondary supply of water to generate an oxygenated and hydrogenated water.

20. The hydroxy gas generator of claim 19, wherein the oxygenated and hydrogenated water is applied to an agricultural site.

21. A method comprising:
structuring a continuously-flowing supply of water using a water structuring device to (i) reduce the surface tension of the continuously-flowing supply of water and (ii) magnetically orient molecules of the continuously-flowing supply of water;
passing the continuously-flowing supply of water through a plurality of anode-cathode pairs to generate hydroxy gas; and
extracting the hydroxy gas using a gas isolation system.

22. A water structuring device for use in a hydroxy gas generator, the water structuring device comprising:
an inlet for receiving a continuously-flowing supply of water;
an outlet for providing the continuously-flowing supply of water to a plurality of anode-cathode pairs; and
a plurality of magnetically-charged spheres arranged into a plurality of centrally-aligned rings along a direction of flow of the continuously-flowing supply of water from the inlet to the outlet, wherein the plurality of centrally-aligned rings includes at least 7 centrally-aligned rings and wherein each of at least a subset of the centrally-aligned rings includes at least 7 magnetically-charged spheres.

23. An anode-cathode pair for use in a hydroxy gas generator, the anode-cathode pair comprising:
- an inlet end for receiving water;
- an outlet end for providing water containing hydroxy gas;
- a cathode extending from the inlet end to the outlet end;
- an anode positioned radially exterior to the cathode and extending from the inlet end to the outlet end, wherein the anode includes a plurality of aeration holes near the inlet end; and
- a jetted cap located at the outlet end,
- wherein the anode and the cathode are harmonically tuned to have an electrical resonant frequency at a predetermined frequency.

* * * * *